E. Rhodes Jr.
Horse Hay-Fork.
N°63812    Patented Apr. 16, 1867.

Witnesses
W. H. Burridge
J. H. Burridge

Inventor
Elias Rhodes Jr.

United States Patent Office.

ELIAS RHODES, JR., OF CLYDE, OHIO.

Letters Patent No. 63,812, dated April 16, 1867.

IMPROVEMENT IN HORSE HAY-FORKS.

The Schedule referred to in these Letters Patent and making part of the same.

TO ALL WHOM IT MAY CONCERN:

Be it known that I, ELIAS RHODES, Jr., of Clyde, in the county of Sandusky, and State of Ohio, have invented certain new and useful improvements in Hay-Forks; and I do hereby declare that the following is a full and complete description thereof, reference being had to the accompanying drawing, making a part of this specification, in which—

Like letters of reference refer to like parts in the different views.

Figure 1:
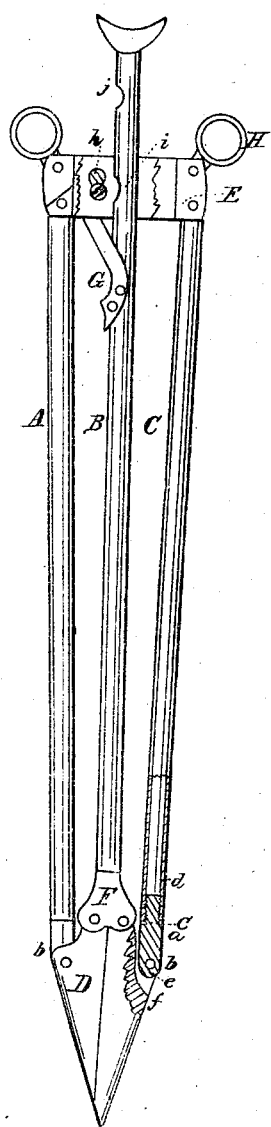
Figure 1 is a view of the fork with the jaws closed.

The fork consists of three tubular links, A, B, and C, the lower ends of which are pivoted to the jaws D, and the upper ends of A and C to the cross-head E; whereas the central link B is allowed to slide freely through the head, a hole being provided for that purpose. The manner in which these links are connected to the jaws and head is as follows: A thread, $a$, fig. 1, is cut in the ends of the tubes, and to which is fitted the shank $b$, by being screwed into it by the stem $c$, on which a corresponding thread is cut for that purpose. The ear $e$ is then introduced into the slot $f$, in the side of the jaws, and a pin inserted, forming thereby a pivoted joint, as above stated. Each connection of the side links is formed in the same manner. The connection of the inner link to the jaws is made by a slotted head, F, which is also screwed into the link B in the same manner as the shank in the side links. The ears in the upper ends of the jaws are pinned in the slots of the head, making a pivoted joint, as in the side links above described. G is an arm operating a lug, $h$, on the inside of the cross-head. H are loops by which the fork is suspended. It will be observed that the jaws do not open directly at the point, but at one side; by this means the point can at all times be kept sharp. It will also be seen that the inside of one of the jaws is grooved with a corresponding bead on the opposite one, which, on coming together, fit closely into each other, thereby preventing any side movement of them when closed or being thrust into the hay.

Figure 2:
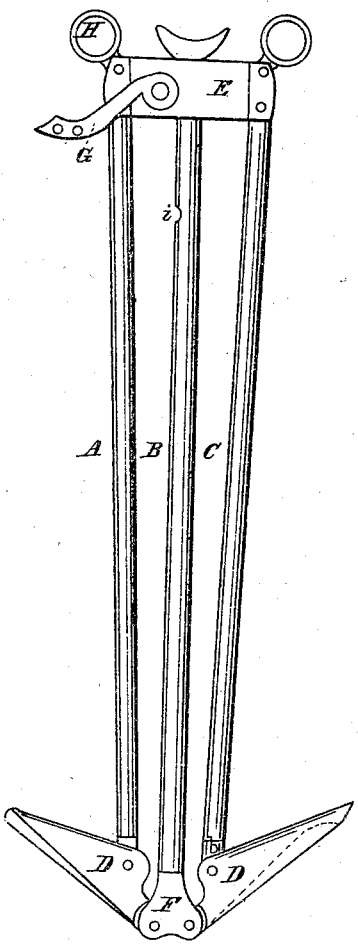
Figure 2 is a view of the same with the jaws open.

The manner of operating the fork is as follows: The fork on being drawn down to the load is then thrust into the hay. The jaws are prevented from opening while passing into the hay by the lug $h$ being forced into the notch $i$, by the arm G, to which it is connected as above stated. When in at the desired depth the lug is drawn out of the notch by pulling the arm down to the position shown in fig. 1, a cord being attached to it for that purpose. When the lug is freed from the notch, the central link can be forced down, thereby causing the jaws to spread out, as shown in fig. 2. When thus spread the notch $j$ is brought down to the lug, into which it is lodged, thus preventing the jaws from closing while the hay is lifted from the load, and carried over to the bay, or wherever it is wanted. The fork is then tripped by pulling the lug from the notch, the weight of the hay causing the jaws to close, and consequently the hay falls into the bay or upon the stack; the fork is then brought down to the load, and the same operation repeated. The fork may be constructed with solid links, but tubular links are preferred for the above reasons.

What I claim as my improvement, and desire to secure by Letters Patent, is—

1. The tubular rods or links A B C, provided with the shanks $b$ and head F, constructed and applied as and for the purpose set forth.

2. The arrangement of the lever-arm G, provided with the lug $h$, in combination with the cross-head E, tubular links A B C, shanks $b$, and jaws D, when the several parts are constructed and arranged as and for the purpose set forth.

ELIAS RHODES, JR.

Witnesses:
W. H. BURRIDGE,
E. E. WAITE.